US009353601B2

(12) United States Patent
Hause

(10) Patent No.: US 9,353,601 B2
(45) Date of Patent: May 31, 2016

(54) ARTICULATION FESTOON CABLING BEAMS

(71) Applicant: Nabors Drilling USA, Houston, TX (US)

(72) Inventor: Ryan Hause, Houston, TX (US)

(73) Assignee: NABORS DRILLING USA, Houston, TX (US)

(*) Notice: Subject to any disclaimer, the term of this patent is extended or adjusted under 35 U.S.C. 154(b) by 177 days.

(21) Appl. No.: 14/174,656

(22) Filed: Feb. 6, 2014

(65) Prior Publication Data
US 2014/0224943 A1 Aug. 14, 2014

Related U.S. Application Data

(60) Provisional application No. 61/763,794, filed on Feb. 12, 2013.

(51) Int. Cl.
E21B 41/00 (2006.01)
H02G 11/00 (2006.01)

(52) U.S. Cl.
CPC ............... E21B 41/00 (2013.01); H02G 11/00 (2013.01)

(58) Field of Classification Search
CPC .................................. H02G 11/00; E21B 41/00
USPC ................... 248/70, 205.1, 53; 166/377, 379; 104/89, 91, 98
See application file for complete search history.

(56) References Cited

U.S. PATENT DOCUMENTS

| 3,721,260 | A | * | 3/1973 | Stahmer | F16L 3/01 137/355.16 |
| 3,802,351 | A | * | 4/1974 | Pascuzzi | B66C 13/12 104/112 |
| 3,867,590 | A | * | 2/1975 | Gasser | H02G 11/003 137/355.16 |
| 4,002,243 | A | * | 1/1977 | Kramer | B66C 23/208 16/368 |
| 4,078,769 | A | * | 3/1978 | Wamfler | H02G 11/003 191/12 R |
| 4,093,047 | A | * | 6/1978 | Wampfler | H02G 11/003 174/69 |
| 4,667,782 | A | * | 5/1987 | Toase | E21F 17/06 191/12 R |
| 4,846,320 | A | * | 7/1989 | Clarke | H02G 11/003 191/12 R |
| 5,524,548 | A | * | 6/1996 | Fox | B61H 7/00 104/249 |
| 6,116,302 | A | * | 9/2000 | Ferneding | A01G 23/08 144/24.13 |
| 7,234,400 | B2 | * | 6/2007 | Winter | B66C 11/06 104/98 |
| 7,484,461 | B2 | * | 2/2009 | Britcher | A63B 69/201 104/89 |
| 7,516,857 | B2 | * | 4/2009 | Muller | B66C 7/06 191/12 R |
| 7,677,372 | B2 | * | 3/2010 | Maier | H02G 11/003 191/12 R |
| 7,739,959 | B2 | * | 6/2010 | Hutchinson | H02G 11/006 104/89 |
| 2012/0305042 | A1 | * | 12/2012 | Lorbiecki | E04H 3/08 135/96 |

* cited by examiner

Primary Examiner — Nkeisha Smith
(74) Attorney, Agent, or Firm — Adolph Locklar

(57) ABSTRACT

The cable handling apparatus includes a trolley beam, where the trolley beam is adapted to allow a cable trolley to slide thereon and an articulating arm. The articulating arm is hingedly coupled to the trolley beam, and the articulating arm is hingedly coupled to a piece of wellsite equipment. The articulating arm is repositionable between a retracted position and an extended position.

12 Claims, 3 Drawing Sheets

ARTICULATION FESTOON CABLING BEAMS

CROSS-REFERENCE TO RELATED APPLICATIONS

This application is a non-provisional application which claims priority from U.S. provisional application No. 61/763,794, filed Feb. 12, 2013.

FIELD OF THE DISCLOSURE

The present disclosure relates generally to cable management systems, and specifically to cable trolleys for use in an oilfield.

BACKGROUND OF THE DISCLOSURE

In land-based rig drilling for oil and gas, a significant amount of equipment is located on the ground on skids or otherwise. This equipment includes, but is not limited to, tankage for various fluids, electrical houses, pumpsheds, and the rig substructure. One rig may be used to drill a number of different wells in a single field. The process of moving the drilling rig from one well to another is "skidding" and rigs capable of being "skidded" are termed "skidding rigs." Festoon systems are often used on skidding rigs where auxiliary buildings and equipment are stationary and the drilling rig moves. Cabling, including communications and electrical power, may be extended along the path of travel by the festoon system. One type of festoon is a trolley system supported on fixed trolley beam sections supported on individual skids and connected together. When rigging and de-rigging, the trolley system must be assembled and disassembled, respectively.

SUMMARY

In one embodiment, the disclosure includes a cable handling apparatus. The cable handling apparatus includes a trolley beam, where the trolley beam is adapted to allow a cable trolley to slide thereon and an articulating arm. The articulating arm is hingedly coupled to the trolley beam, and the articulating arm is hingedly coupled to a piece of wellsite equipment. The articulating arm is repositionable between a retracted position and an extended position.

In another embodiment of the present disclosure a beam trolley festoon system is disclosed. The beam trolley festoon system includes a first trolley beam. The first trolley beam is adapted to allow a cable trolley to slide thereon. The beam trolley festoon system further includes a first articulating arm. The first articulating arm is hingedly coupled to the first trolley beam, and the first articulating arm is hingedly coupled to a first piece of wellsite equipment. The first articulating arm is repositionable between a retracted position and an extended position. The beam trolley festoon system further includes a second trolley beam, the second trolley beam adapted to allow the cable trolley to slide thereon and a second articulating arm. The second articulating arm is hingedly coupled to the second trolley beam, and the second articulating arm is hingedly coupled to a second piece of wellsite equipment. The second articulating arm is repositionable between a retracted position and an extended position. The first trolley beam and second trolley beam are selectively coupleable when in the extended position.

The present disclosure also provides for a method for rigging up a beam trolley festoon system. The method may include positioning a first piece of wellsite equipment at a wellsite. The first piece of wellsite equipment may include a first trolley beam, the first trolley beam adapted to allow a cable trolley to slide thereon; a first articulating arm, the first articulating arm hingedly coupled to the first trolley beam, the first articulating arm hingedly coupled to the first piece of wellsite equipment, the first articulating arm repositionable between a retracted position and an extended position. The method may further include positioning a second piece of wellsite equipment at the wellsite generally aligned with and near the first piece of wellsite equipment. The second piece of wellsite equipment may include a second trolley beam, the second trolley beam adapted to allow the cable trolley to slide thereon; a second articulating arm, the second articulating arm hingedly coupled to the second trolley beam, the second articulating arm hingedly coupled to the second piece of wellsite equipment, the second articulating arm repositionable between a retracted position and an extended position. The method may also include positioning the first and second trolley beams into the extended position; coupling the first and second trolley beams.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
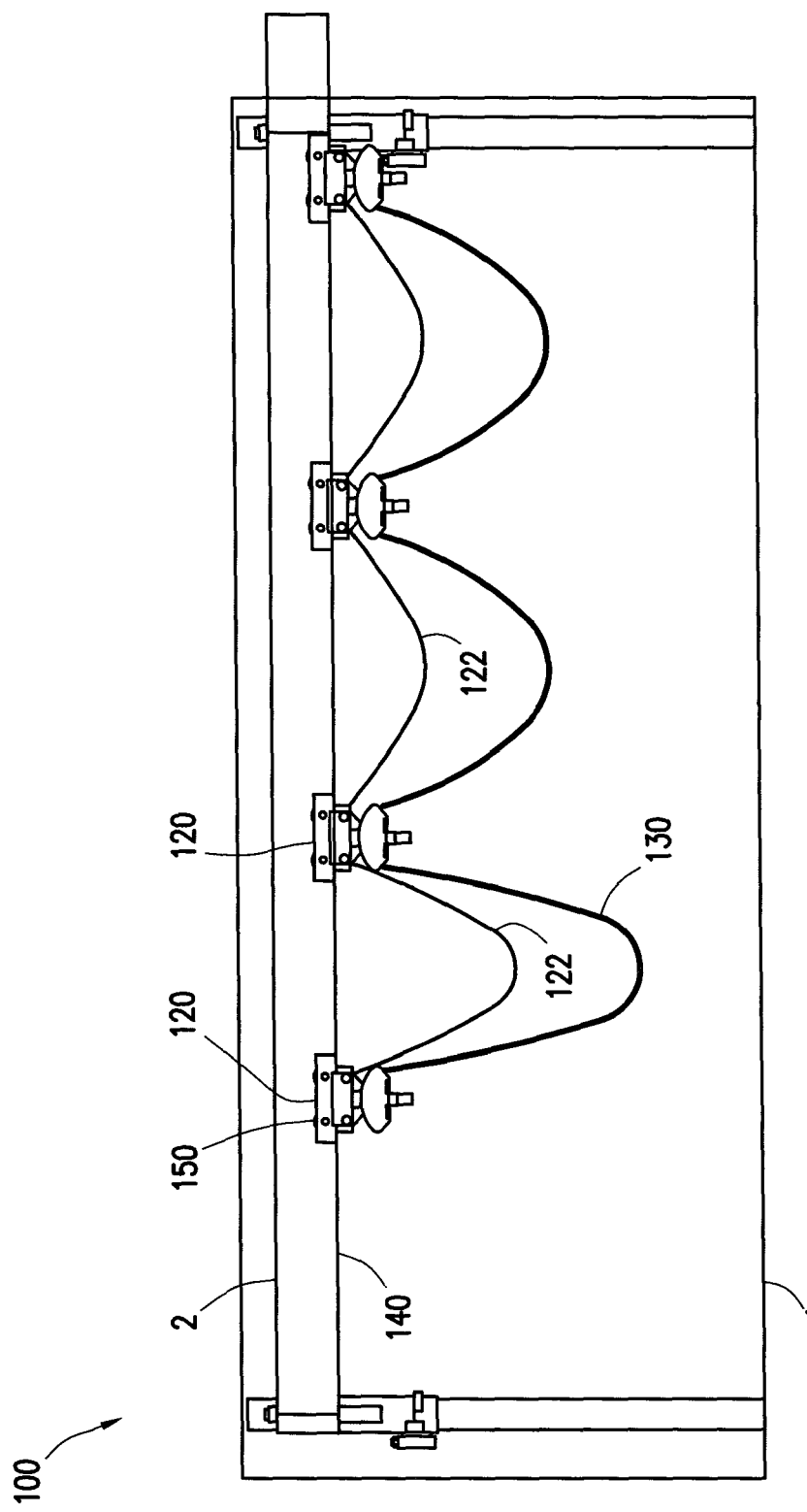
FIG. 1 is a festoon system that is consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
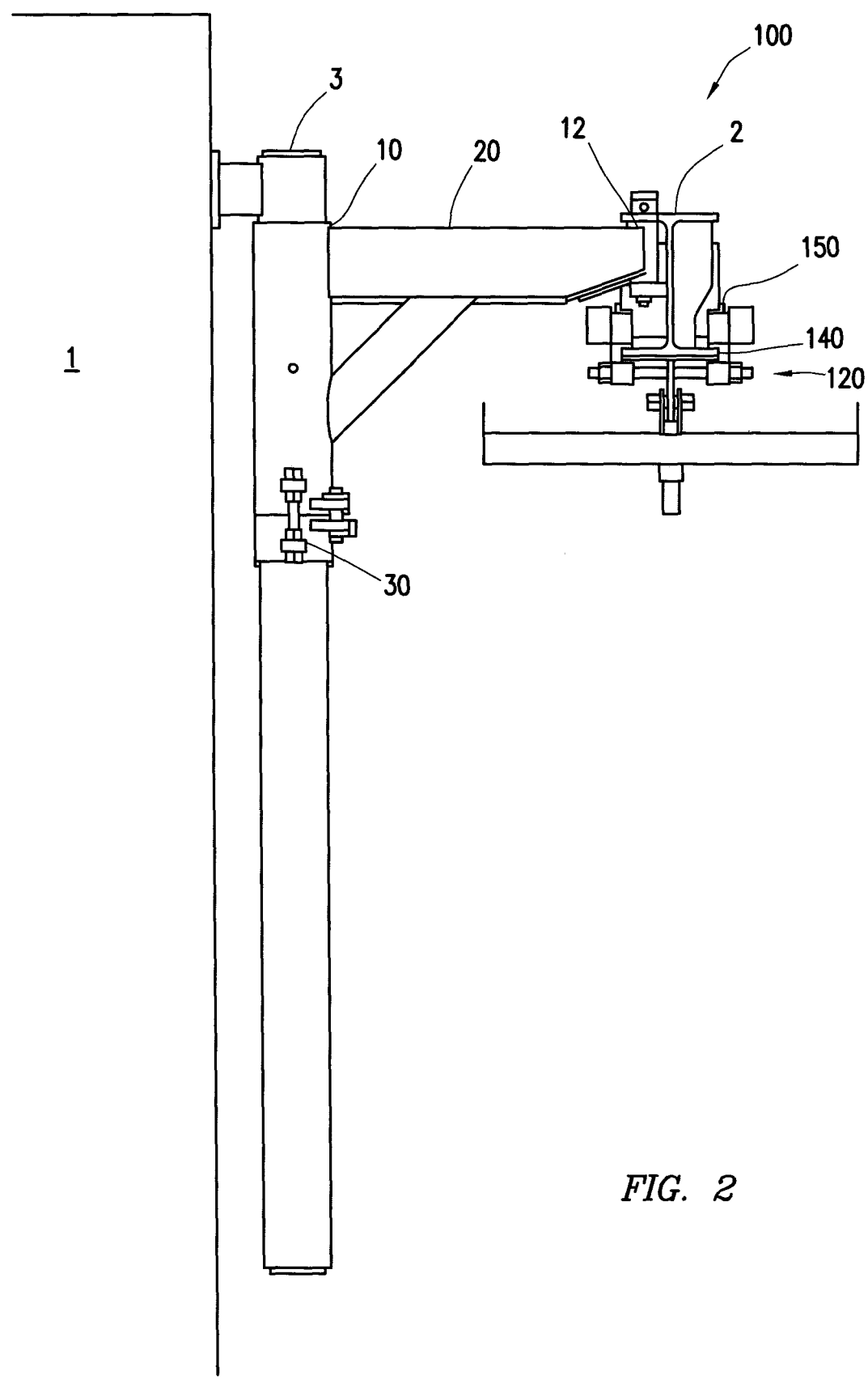
FIG. 2 depicts a side view of the festoon system of FIG. 1.

FIGS. 1, 2 depict beam trolley festoon system 100 for use in certain embodiments of the present disclosure. Beam trolley festoon system 100 may include trolley beams or rails ("beams") 2, trolleys 120, and cables 130. In certain embodiments of the present disclosure, beam 2 may be an I-beam as understood in the art, upon which wheels 150 of trolleys 120 traverse cross-portion 140 of beam 2. Each trolley 120 may be positioned to couple to one or more cables 130, such that when trolleys 120 are spaced close together, cables 130 "festoon" or hang between adjacent trolleys. One having ordinary skill in the art with the benefit of this disclosure will understand that cables 130 may include, for example and without limitation, electrical cables, data cables, hydraulic hoses, and/or low pressure fluid lines.

As cables 130 are extended, trolleys 120 slide correspondingly along beams 2. In some embodiments, each trolley 120 may be coupled to an adjacent trolley by spacing cables 122. Spacing cables 122 may be shorter than the length of cable 130 between the adjacent trolleys 120. Spacing cables 122 may serve to, as trolleys 120 are pulled apart, prevent the overextension or tensile overloading of cables 122, and, for example, pull the adjacent trolley along beams 2 without tensile loading of cables 122.

Figure 3:
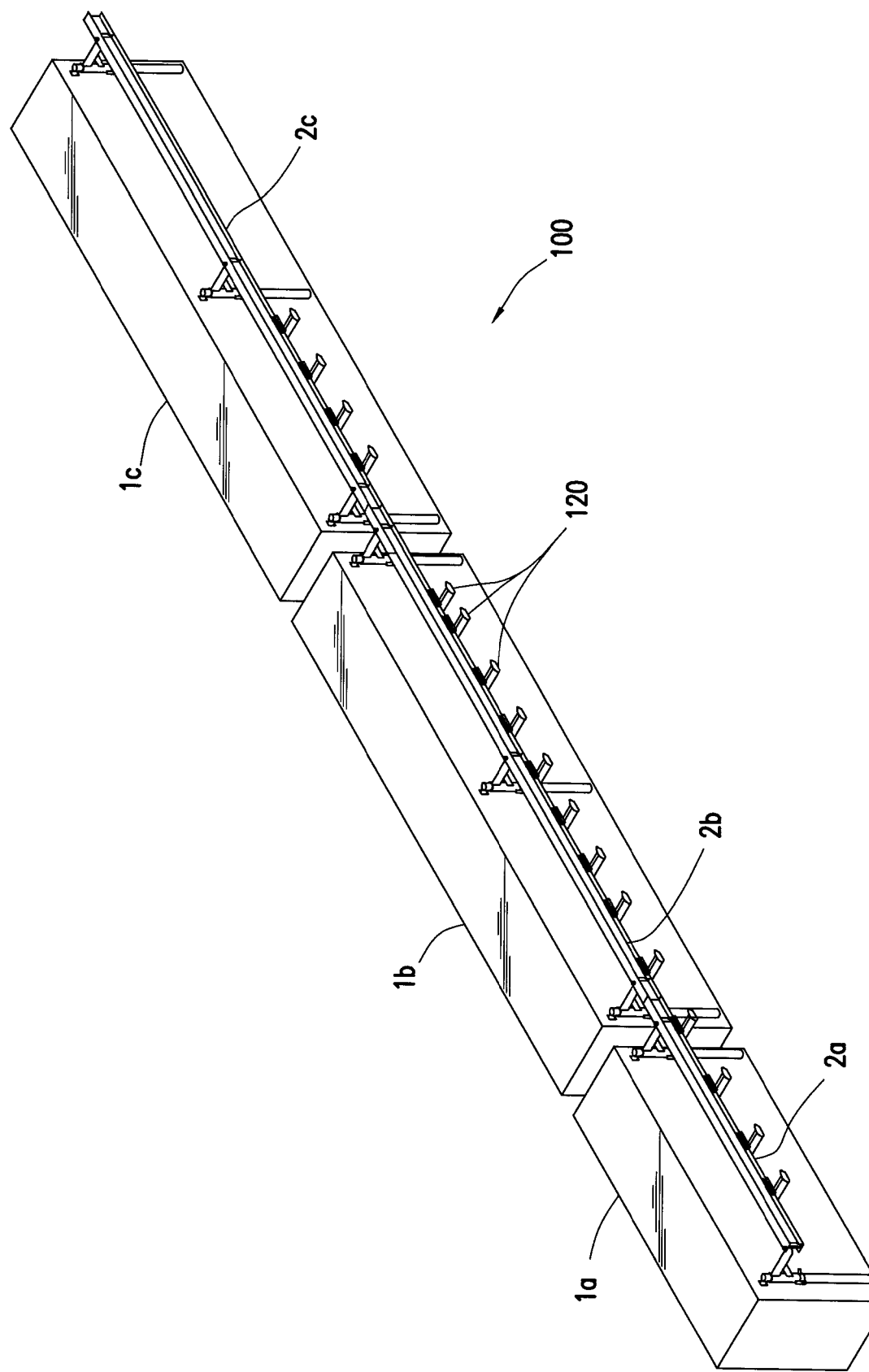
FIG. 3 depicts a festoon system that is consistent with at least one embodiment of the present disclosure.

In some embodiments, beams 2 of beam trolley festoon system 100 may be coupled to multiple pieces of wellsite equipment. By installing beams 2 on wellsite equipment which is to be transported to the wellsite, beam trolley festoon system 100 may be modularized and transported to and from a wellsite at the same time as the wellsite equipment and without additional transportation equipment. For example, FIG. 3 depicts multiple beams 2a-2c of beam trolley festoon system 100 each attached to a corresponding piece of wellsite equipment 1a-1c. One having ordinary skill in the art with the benefit of this disclosure will understand that the wellsite equipment may instead be a well site equipment structure including, for example and without limitation, an equipment house, tank, mud pump skid, or substructure box framing without deviating from the scope of this disclosure. By positioning wellsite equipment 1a-1c in the wellsite aligned end to end, each beam 2a-2c of beam trolley festoon system 100 may be coupled end-to end to form a continuous length of beam along which trolleys 120 may slide. Beams 2a-2c do not need to be removed during rig-up or rig-down operations. As a result, there is no additional rig-up or rig-down downtime attributed to connecting the beams to equipment or disconnecting the beams from equipment.

Referring to FIG. 2, beam 2 may be hingedly coupled to structure 3 of wellsite equipment 1 via at least one articulating arm 20. Articulating arm 20 may be coupled to frame 3 via a hinge mechanism 10. Articulating arm 20 may be coupled to beam 2 by hinge mechanism 12. Hinge mechanisms 10, 12 may be adapted to allow beam 2 to move between a retracted and an extended position by rotating horizontally. In the retracted position, beam 2 may be positioned near frame 3, allowing, for example, wellsite equipment 1 and frame 3 to be trailered with minimal protrusion of beam 2 therefrom. In the extended position, as depicted in FIG. 2, beam 2 may be used as described above as a cable trolley beam. Articulating arm 20 may be locked into either the extended or retracted positions by pinning mechanism 30. Pinning mechanism 30 may, for example, include pins positioned to retain hinge mechanism 10 in the extended or retracted position. One having ordinary skill in the art with the benefit of this disclosure will understand that any suitable mechanism may be substituted without deviating from the scope of this disclosure. For example, pinning mechanism 30 may include one or more detents positioned on hinge mechanism 10 to, for example, allow articulating arm 20 to remain in one or more positions including but not limited to the extended and the retracted positions.

Although described specifically with regard to cable trolleys, one having ordinary skill in the art with the benefit of this disclosure will understand that any trolley may be used on beam 2 of beam trolley festoon system 100. For example, a trolley may be used to hoist and move pieces of rig equipment such as, for example and without limitation, cable spools from one place at the wellsite to another.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A beam trolley festoon system comprising:
    a first trolley beam, the first trolley beam adapted to allow a cable trolley to slide thereon;
    a first articulating arm, the first articulating arm hingedly coupled to the first trolley beam, the first articulating arm hingedly coupled to a first piece of wellsite equipment, the first articulating arm repositionable between a retracted position and an extended position;
    a second trolley beam, the second trolley beam adapted to allow the cable trolley to slide thereon;
    a second articulating arm, the second articulating arm hingedly coupled to the second trolley beam, the second articulating arm hingedly coupled to a second piece of wellsite equipment, the second articulating arm repositionable between a retracted position and an extended position;
    the first trolley beam and second trolley beam selectively coupleable when in the extended position.

2. The beam trolley festoon system of claim 1, wherein the first and second pieces of wellsite equipment are positioned in a wellsite substantially aligned such that, when the first and second articulating arms are positioned in the extended position, the first and second trolley beams are substantially aligned and are coupleable to form a continuous trolley beam assembly such that the cable trolley may slide freely from the first trolley beam to the second trolley beam.

3. The beam trolley festoon system of claim 2, wherein two or more cable trolleys are positioned on the continuous trolley beam.

4. The beam trolley festoon system of claim 3, wherein a cable is coupled to each of the cable trolleys such that the cable festoons below each of the cable trolleys as each of the cable trolleys move closer together.

5. The beam trolley festoon system of claim 3, wherein each cable trolley of the two or more cable trolleys is coupled to at least one adjacent cable trolley by a spacing cable, the spacing cable having a length shorter than a length of the cable between the adjacent cable trolleys.

6. The beam trolley festoon system of claim 1, wherein the first and second articulating arms are hingedly coupled to the first and second pieces of wellsite equipment by a first and second hinge assemblies respectively, the first and second hinge assemblies each comprising a hinge and a pinning assembly, the pinning assembly positioned to retain the first and second articulating arms in at least one of the retracted position and the extended position.

7. The beam trolley festoon system of claim 1, wherein the first and second trolley beams comprise an I-beam.

8. The beam trolley festoon system of claim 1, wherein the first piece of wellsite equipment comprises a frame and the first articulating arm is hingedly coupled to the frame of the first piece of wellsite equipment.

9. The beam trolley festoon system of claim 1, wherein the first piece of wellsite equipment comprises one of an equipment house, tank, mud pump skid, or substructure box framing.

10. A method for rigging up a beam trolley festoon system, the method comprising:
- positioning a first piece of wellsite equipment at a wellsite, the first piece of wellsite equipment including:
  - a first trolley beam, the first trolley beam adapted to allow a cable trolley to slide thereon;
  - a first articulating arm, the first articulating arm hingedly coupled to the first trolley beam, the first articulating arm hingedly coupled to the first piece of wellsite equipment, the first articulating arm repositionable between a retracted position and an extended position;
- positioning a second piece of wellsite equipment at the wellsite generally aligned with and near the first piece of wellsite equipment, the second piece of wellsite equipment including:
  - a second trolley beam, the second trolley beam adapted to allow the cable trolley to slide thereon;
  - a second articulating arm, the second articulating arm hingedly coupled to the second trolley beam, the second articulating arm hingedly coupled to the second piece of wellsite equipment, the second articulating arm repositionable between a retracted position and an extended position;
- positioning the first and second trolley beams into the extended position;
- coupling the first and second trolley beams.

11. The method of claim 10, further comprising:
- pinning with a pinning assembly at least one of the first or second articulating arms in the extended position.

12. The method of claim 10, further comprising:
- decoupling the first and second trolley beams;
- positioning the first trolley beam into the retracted position;
- transporting the first piece of wellsite equipment to another location.

* * * * *